Feb. 3, 1931. L. E. RABJOHN ET AL 1,790,947
WATER FILTER
Filed Jan. 2, 1929
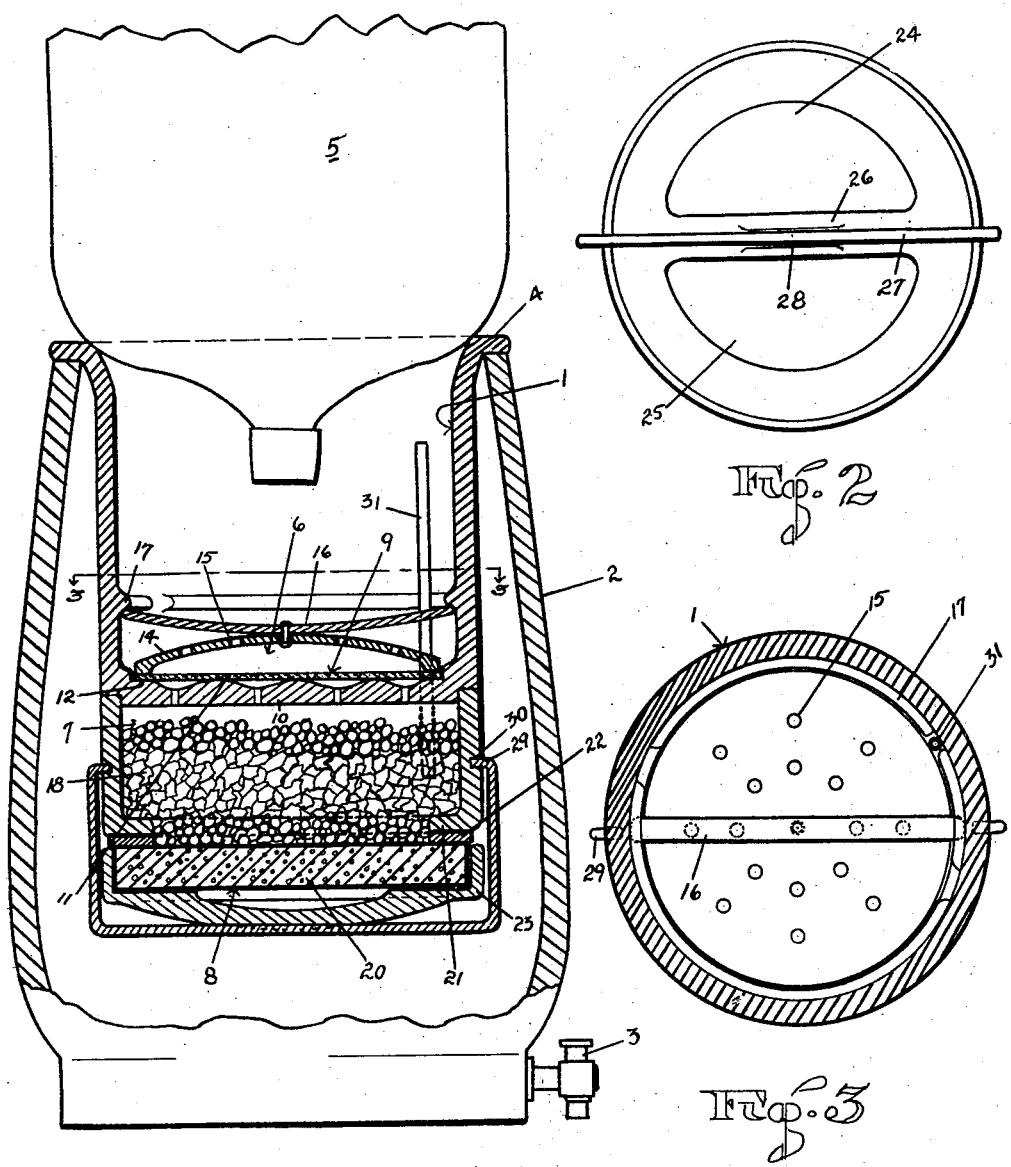
INVENTOR
L.E. RABJOHN
R.W. HOLLENBERG
BY
ATTY.

Patented Feb. 3, 1931

1,790,947

UNITED STATES PATENT OFFICE

LLOYD E. RABJOHN AND RALPH W. HOLLENBERG, OF OAKLAND, CALIFORNIA, ASSIGNORS TO COOL SPRING FILTERS, INC., OF SAN FRANCISCO, CALIFORNIA, A CORPORATION OF CALIFORNIA

WATER FILTER

Application filed January 2, 1929. Serial No. 329,755.

This invention relates to an improved water filter which is especially designed for use in connection with the present day popular type of water dispenser comprising a water cooling receptacle supporting a bottle or like receptacle containing a supply of water.

One of the objects of the invention is to provide a simply constructed, inexpensive, small, compact and efficient filter which may be contained within the water cooling receptacle in such manner that little or no room is taken up, the bulk of the dispensing apparatus is not increased, and the filter is entirely concealed, it being unnecessary to make any changes in the construction of the water dispensing apparatus in order to incorporate the filter of our invention therewith.

Another object of the invention is to provide a filter of the character described in which the filtering action is accomplished by the employment of a plurality of filtering elements or stages, one of which comprises a porous filter stone associated with the other stages in an ingenious manner and so that it may be readily removed in order that it may be renewed or cleaned.

Another object is to provide a filter of the character described in which an expeditious effective filtering of the water is brought about before said water contacts with the filter stone thereby preventing the stone from becoming soiled and clogged.

Another object is to provide a novel construction as to the body of the filter, which construction permits of quick and easy assembling and disassembling of the filtering device and easy and thorough cleaning thereof.

A further object is to provide a filter in which the filtering elements are arranged in such a manner as to produce a controlled filtering action whereby a comparatively great quantity of partly filtered water is caused to remain for a comparatively long time in a chamber containing charcoal and gravel, due to the location of the slow filtering stone as the last filtering stage, the stone in other words, comprising the bottom wall of the chamber containing the charcoal and gravel filtering elements.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a vertical sectional view of the filtering medium of my invention shown mounted within and with the glass water bottle supported therein.

Fig. 2 represents a bottom plan view of a means for holding the filtering stone in place.

Fig. 3 represents a cross sectional view taken on the plane of line 3—3 of Fig. 1.

In the embodiment of the invention shown in the accompanying drawing, the filtering device is contained in a cylindrical casing or housing 1 which is suspended in the water cooling and dispensing vessel 2. This vessel is of the type known as an olla and has a valved discharge nozzle 3 at its lower end. The housing or casing 1 is spaced circumferentially from the cooling vessel 2 except at its upper end where there is provided an annular lateral flange 4 which rests on the upper edge of the vessel. In this way the filter is suspended in the center of the cooler so that it is substantially concealed therein and subject to reception of water to be filtered from a storage receptacle 5. In the present instance this storage receptacle is in the form of a glass bottle such as now commonly used for water dispensing operations, the neck of the bottle extending into the upper end of the housing 1 and being supported thereby so that water will readily pour therefrom into the filter. By this arrangement the filter of my invention may be readily and easily incorporated with the present day style of water dispensing apparatus without requiring any changes in the construction of the latter.

Contained within the filter housing 1 are three filtering stages generally designated 6, 7 and 8. The uppermost stage permits of a faster filtering of the water therethrough than the lowermost stage. The intermediate stage 7 is in the form of a compartment containing charcoal and gravel and will retain for a comparatively long time a comparatively great quantity of water in contact with the charcoal in order to improve the quality of the filtered water which finally slowly filters through the lower stage.

The first filtering stage designated 6 comprises a flexible pad or compressible fabric such as asbestos placed upon a perforated false bottom 10, which latter extends across the casing 1 at a point above the lower end thereof. The upper side of this perforated bottom 10 is provided with a series of protuberances and depressions or corrugations indicated at 11. On the upper side of the false bottom is an annular shoulder 12 upon which the filtering pad engages, the pad extending across the irregular upper surface of the false bottom so that it touches only on the raised or projecting portions of said surface. The openings or perforations are formed through the depressed portions of the bottom thereby leaving room for the swelling or expanding of the pad as will take place when the fibers become wet. This permits of free expansion of the asbestos pad and insures a free filtering of the water through the pad without a tendency towards clogging as would be the case if the pad were placed on a flat surface and were not permitted to expand. The perforations and corrugations prevent clogging of the perforations by the pad and in all this arrangement insures a better, quicker but thorough filtering action than would be provided if the closely compressed asbestos pad were placed on a flat supporting surface.

A concavo-convex holder 14 with its concave side opposed to the upper side of the filtering body is employed for holding the body in place within the holder, being spaced from the pad except as to its periphery which engages the pad near its periphery and presses the same down upon the shoulder 12. The holder 14 is provided with a plurality of perforations or openings 15 which permit water to pass through it to the pad. Pivoted centrally of its ends upon the upper side of the holder 14 is a bowed spring clip 16, the ends of which are adapted to be pushed beneath segmental flanges or projections 17 provided on the inside of the casing 1, whereby the spring is maintained under tension and pushes down on the holder so that the latter is pressed down and holds the pad in place. By moving this spring into registration with the spaces between the segmental projections 17, its movement into and out of place may be readily effected.

The second filtering stage 7 includes the space occupying the lower end of the housing 1, which space is formed into a closed compartment by the lower filtering stage 8. In this compartment or space is placed a suitable quantity of charcoal and gravel, or other similar suitable filtering material, indicated at 18. Water filtering through the pad 9 will collect in the compartment containing the charcoal and gravel and will be filtered and improved as to its taste due to its retention in the compartment with these filtering mediums.

The lower filtering stage 8 is in the form of a circular porous filter stone 20 of the type commonly used for filtering purposes and which is removably mounted in place. The lower end of the housing 1 is provided with an inwardly extending annular flange 21 against the lower side of which a rubber gasket 22 is placed. Next to this the stone 20 is placed. The stone is cemented or otherwise secured in a cup-shaped holder 23, which holder is provided with large openings 24 and 25 to permit free filtering of the water through the stone so that it will drip into the lower part of the cooling receptacle. The web or cross member 26 on the holder is bowed downwardly so as to be spaced below the lower surface of the stone. A resilient U-shaped clamp or bail 27 engages in a groove 28 in the member 26 of the holder and has its ends bent inwardly right angularly as at 29 so that they may be engaged in sockets or openings 30 provided in the outer side of the housing 1. When the bail or clamp is in position as shown in Fig. 1, the stone is firmly held in place on the bottom of the filter but it may be readily removed by disengaging the bail or clamp. In this way the stone may be readily renewed or cleaned and access to the filtering chamber is also provided whereby said chamber may be cleaned or the filtering elements therein renewed. By providing a fabric pad filtering element as the first stage, the water is partially filtered before it enters the compartment containing the charcoal and gravel so that by the time the water reaches the stone 8 it is free from such elements as would otherwise tend to clog and soil the stone. Inasmuch as the stone provides a slower filtering action than the other elements, the water will be retained for a comparatively greater time and in a comparatively great quantity in the presence of the charcoal and gravel, and thereby improved as to taste and other qualities.

It is found desirable to aerate the lower compartment containing the charcoal and gravel and to this end there is provided a small air tube 31 which extends through the false bottom 12 into the lower chamber, with its upper end terminating near the upper end of the casing 1.

The first filtering stage is located approximately at the center of the housing 1 and this leaves a large space in the upper part of said housing to serve as a storage compartment for water flowing from the reservoir 5. In this way the capacity of the ordinary water dispenser is increased.

We claim:

1. A fluid filter comprising a vessel provided with a discharge opening at its lower end, a porous filter stone extending over and closing said opening, filtering elements mounted in the vessel above the stone, a cup in which said stone is secured against the bottom of the vessel, which cup is provided with openings therein and a resilient U-shaped clamp engaged with and supporting said cup, said vessel having openings in opposite sides adapted to receive terminals of said clamp.

2. A fluid filter comprising a vessel provided with a discharge opening at its lower end, a porous filter stone extending over and closing said opening, filtering elements mounted in the vessel above the stone, a cup in which said stone is secured against the bottom of the vessel, which cup is provided with openings therein, a resilient U-shaped clamp engaged with and supporting said cup, said vessel having openings in opposite sides adapted to receive terminals of said clamp; and a rubber gasket disposed between the vessel bottom and the stone to seal the filter thereat.

LLOYD E. RABJOHN.
RALPH W. HOLLENBERG.